3,090,730
PROCESS FOR THE PRODUCTION OF CYCLOSERINE

Roger L. Harned, Terre Haute, Ind., assignor to Commercial Solvent Corporation, New York, N.Y., a corporation of Maryland
No Drawing. Filed Oct. 25, 1960, Ser. No. 64,732
9 Claims. (Cl. 195—80)

My invention relates to a process for the production of cycloserine, and more particularly it relates to a process for producing the antibiotic cycloserine by biosynthesis utilizing a chemically defined nitrogen source.

Cycloserine is a broad spectrum antibacterial agent possessing activity against both gram negative and gram positive bacteria including mycobacteria such as *Mycobacterium ranae* and has been found to be particularly effective in the treatment of tuberculosis and urinary tract infections in man. The antibiotic is produced by fermentation utilizing cycloserine-producing strains of microorganisms of the genus Streptomyces such as *Streptomyces orchidaceous*, *Streptomyces virginiae*, and *Streptomyces lavendulae*. The antibiotic is an amphoteric substance possessing weakly acidic and weakly basic groups, the antibiotic being very soluble in water but essentially insoluble in most common organic solvents such as glycols, isopropyl alcohol, methanol, ethanol, acetone, hexane, benzene, chloroform, ether, petroleum ether, dioxane, 1-butanol, ethyl acetate, and ethylene dichloride. The antibiotic melts with decomposition at about 150° C. Cycloserine has the following structural formula:

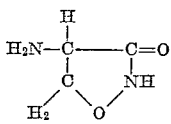

Previously, cycloserine has been successfully prepared by fermentation using a cycloserine-producing microorganism in an aqueous fermentation medium consisting of a nitrogen source, a carbohydrate source, and calcium carbonate. Several nitrogen sources such as alfalfa meal, amino acid cake, milk solids, whey nutrient, dried wheat slop, and casein have been previously utilized. However, the best yields of cycloserine have been obtained when soybean products such as soybean oil meal and dry soybean meal-like products are utilized. However, soybean materials are not of a definite standardized composition. Their use therefore makes it difficult to obtain the antibiotic in predictable yields. Also, fermentation batches of cycloserine wherein soybean products are utilized as the nitrogen source, contain many impurities which can be removed only by costly and time-consuming purification procedures. For example, the fermentation beer has a dark color due to pigments produced by cycloserine-producing microorganisms when soybean products are utilized as the nitrogen source and contains a large amount of residue from non-assimilable soybean material. Impurities such as these are presently removed from cycloserine by a long process which includes adjusting the pH of the fermentation medium to about 3 to 6, filtering the pH adjusted fermentation medium, adsorbing the cycloserine in the thus filtered fermentation medium on an ion exchange resin, eluting the cycloserine from the ion exchange resin, decolorizing the eluate with char, removing the char, adjusting the pH of the decolorized eluate to about 6.8, and precipitating the cycloserine as a water-insoluble crystalline salt with a metallic cation such as silver, copper, or zinc. Free cycloserine can then be recovered by any suitable means. This purification procedure is not only costly and time consuming, but large amounts of the antibiotic, normally more than 25%, are lost especially during the ion exchange treatment thus greatly reducing the final yield of cycloserine.

I have now discovered a process whereby cycloserine can be produced in improved and highly predictable yields in a fermentation medium utilizing a synthetic chemically defined nitrogen source, such as urea, ammonia or ammonium salts and can then be easily recovered from this fermentation medium with a minimum of loss of the antibiotic.

My new process, for the production of cycloserine, involves essentially fermenting under aerobic conditions a cycloserine-producing microorganism of the genus Streptomyces in an aqueous fermentation medium consisting of a carbohydrate source, a magnesium source, a potassium source, a phosphate source, an iron source, a zinc source, a manganese source, and a chemically defined nitrogen source at a temperature ranging from about 25 to about 37° C. for a period of from about three to five days wherein a ratio of carbohydrate to available nitrogen is maintained at about 10–20 to 1. I prefer a ratio of carbohydrate to available nitrogen of 15–20 to 1.

Suitable chemically defined sources of nitrogen which can be employed in my fermentation medium for the production of the antibiotic cycloserine include urea, ammonia, and ammonium salts of mineral acids such as ammonium carbonate and ammonium sulfate. I prefer to use urea.

Suitable carbohydrate sources which can be employed in my fermentation medium for the production of the antibiotic cycloserine include starch and glucose. Other carbohydrate sources which can be employed include xylose, maltose, fructose, as well as dextrans and metabolizable lipids such as peanut oil, olive oil, cotton seed oil, etc. I prefer, however, to use starch as the carbohydrate source in my fermentation medium.

As a manganese source I prefer $MnSO_4$, as a magnesium source I prefer $MgSO_4$, as a potassium source and phosphate source I prefer $K_2HPO_4$, as an iron source I prefer $FeSO_4$, and as a zinc source I prefer $ZnSO_4$.

In carrying out the process of my invention I can generally employ an aqueous nutrient medium containing from about 3 to about 8% carbohydrate, about 0.05% $MgSO_4$, about 0.05% $K_2HPO_4$, about 0.002% $FeSO_4$, about 0.002% $ZnSO_4$, about 0.001% of $MnSO_4$ and from about 0.1 to about 0.5% of nitrogen available in the nitrogen source with the provision that the ratio of carbohydrate to the available nitrogen is maintained at about 10–20 to 1. In carrying out my process it is often necessary to add an antifoam agent to the nutrient medium during fermentation to control foaming and any of the usual antifoam agents such as, for example, lard oil, mineral oil, etc., are suitable in my process. When conducting my new process under the preferred conditions, I am able to produce easily recoverable cycloserine in amounts ranging from about 2,000 to 3,000 micrograms per milliliter even when operating on a commercial scale.

Cycloserine-producing organisms of the genus Streptomyces are aerobic organisms. Therefore, air must be supplied to the fermentation medium and agitation should be employed to disperse the added air throughout the fermentation medium.

The cycloserine produced by my process can be easily purified and recovered by any suitable means. In order to insure maximum recovery of the antibiotic, I prefer to first filter the fermentation medium to remove the mycelia. To the filtered medium is then added a decolorizing agent such as activated carbon, an acid such as nitric or sulfuric to adjust the pH to about 3.0, and a metallic cation such as silver in the form of silver nitrate. This mixture is then agitated to decolorize the mixture and allow essentially complete precipitation of chlorides. After agitation the mixture is filtered to yield a water white, essentially chloride-free, sparkling filtrate from which the water insoluble metal salt of cycloserine is precipitated by adjusting the pH of the filtrate to about 6.5 preferably with sodium hydroxide. The insoluble metal salt of cycloserine can then be slurried in water and a material, such as hydrochloric acid, added thereto which is capable of precipitating the metal ion as an insoluble salt thereby liberating the cycloserine which goes into solution in the water present. Free cycloserine can then be recovered from the aqueous solution by freeze drying under vacuum to obtain an amorphous preparation of very high purity or the cycloserine can be crystallized from the aqueous solution by adding to the solution a water-miscible solvent in which cycloserine is insoluble.

The following examples are offered to illustrate my new process for the production of cycloserine; however, I do not intend to be limited to the specific materials, proportions and procedures shown and described. Rather, I intend to include within the scope of my invention, all equivalents obvious to those skilled in the art.

*Example I*

*Streptomyces orchidaceous* was cultivated in an aqueous seed culture medium of the following composition:

| | Percent |
|---|---|
| Cerelose | 1 |
| Gelatin | .5 |
| $NaNO_3$ | .3 |
| $MgSO_4\cdot 7H_2O$ | .05 |
| $K_2HPO_4$ | .05 | for a period of 24 hours at 30° C.

A 9,000 gallon portion of the following medium was then placed in a fermentor and the contents thereof sterilized for 15 minutes at 121° C.

| | Percent |
|---|---|
| Starch | 5 |
| $MgSO_4\cdot 7H_2O$ | .05 |
| $K_2HPO_4$ | .05 |
| $FeSO_4\cdot 7H_2O$ | .002 |
| $ZnSO_4$ | .002 |
| $MnSO_4$ | .001 |
| Lard oil | 0.4 |

0.48% of sterile urea was then added to the sterilized medium. The fermentor was then inoculated with 800 gallons of seed culture prepared as above-described and the medium was incubated at 30° C. for 86 hours, the medium being aerated at a rate of 800 cubic feet per minute. At the end of the 86-hour fermentation period it was found that the medium contained 2,600 micrograms of cycloserine per milliliter.

*Example II*

The procedure of Example I was followed with the exception that 7% starch and .62% urea were utilized to produce titers containing 3,000 micrograms of cycloserine per milliliter at the end of a 72-hour fermentation period.

*Example III*

The procedure of Example I was followed with the exception that 0.48% ammonia was utilized to produce results similar to those of Example I.

*Example IV*

The procedure of Example I was followed with the exception that 0.48% ammonium carbonate was utilized to produce results similar to those of Example I.

*Example V*

A 69-gallon portion of nutrient fermentation medium containing 2,256 micrograms of cycloserine per milliliter, a total of 592 grams, the nutrient fermentation medium being that in which the cycloserine was produced according to the procedure of Example I was filtered with a filter aid. To the filtered medium was then added 1% by weight of activated carbon, the pH of the mixture was adjusted to 3.0 with nitric acid, and 1131 grams of $AgNO_3$ were added thereto. The mixture was then thoroughly agitated for a 30-minute period and was then filtered. The pH of the filtrate was then adjusted to 6.8 with dilute aqueous NaOH to precipitate the silver salt of cycloserine. The precipitated silver cycloserine was then dried and weighed to give 1,011 grams of silver cycloserine which contained 442 grams of cycloserine. This represents a recovery of 74.5% of the cycloserine in the fermentation medium. Deionized water was then added to the 1,011 grams of silver cycloserine and the resulting mixture was slurried. To this slurry was then added HCl to precipitate solid AgCl thereby placing free cycloserine in aqueous solution. The solid AgCl was then removed by filtration. $H_2S$ was then bubbled through the aqueous cycloserine solution to precipitate residual amounts of silver and the precipitated AgS was removed by filtration. The resulting filtrate was then placed in cold isopropyl alcohol to obtain 369 grams of white crystalline cycloserine. This represents a 62% recovery of cycloserine.

Now having described my invention, what I claim is:

1. A process for the production of cycloserine which comprises growing the cycloserine-producing microorganism *Streptomyces orchidaceous* in an aqueous fermentation medium consisting essentially of a carbohydrate source, a material selected from the group consisting of urea, and ammonia as the sole source of available nitrogen, a magnesium source, a potassium source, a phosphate source, an iron source, a zinc source, a manganese source and water, wherein the ratio of carbohydrate to the available nitrogen in the nitrogen source is maintained at from about 10 to 1 to 20 to 1 under aerobic conditions.

2. In a process for the production of cycloserine by fermentation with the cycloserine-producing microorganism *Streptomyces orchidaceous,* the improvement which comprises carrying out the fermentation in an aqueous fermentation medium consisting essentially of a carbohydrate source, a nitrogen source selected from the group consisting of urea, and ammonia as the sole source of available nitrogen, a magnesium source, a potassium source, a phosphate source, an iron source, a zinc source, a manganese source and water, wherein a ratio of carbohydrate to the available nitrogen in the nitrogen source is maintained at from about 10 to 1 to 20 to 1 under aerobic conditions at a temperature ranging from about 25 to about 37° C. for a period ranging from about three to five days.

3. In a process for the production of cycloserine by fermentation with the cycloserine-producing microorganism *Streptomyces orchidaceous,* the improvement which comprises carrying out the fermentation in an aqueous fermentation medium consisting essentially of urea as the sole source of available nitrogen, a carbohydrate source, a magnesium source, a potassium source, an iron source, a zinc source, a manganese source and water wherein a ratio of carbohydrate to available nitrogen is maintained at from about 10 to 1 to 20 to 1 under submerged aerobic conditions at a temperature ranging from about 25 to about 37° C. for a period ranging from about three to five days.

4. The process of claim 3 wherein the magnesium source is $MgSO_4$, the source of potassium and phosphate is $K_2HPO_4$, the source of iron is $FeSO_4$, the source of zinc is $ZnSO_4$, and the source of manganese is $MnSO_4$.

5. The process of claim 3 wherein lard oil is incorporated into the aqueous fermentation medium.

6. The process of claim 3 wherein the carbohydrate source is selected from the group consisting of starch, glucose, maltose, and fructose.

7. In a process for the production of cycloserine by fermentation with the cycloserine-producing microorganism *Streptomyces orchidaceous* in an aqueous medium consisting essentially of a carbohydrate source, a magnesium source, a potassium source, a phosphate source, an iron source, a zinc source, a manganese source and water, the improvement which comprises incorporating urea into the said aqueous medium as the sole source of available nitrogen in amounts wherein a ratio of carbohydrate to available nitrogen is maintained at from about 10 to 1 to 20 to 1 and carrying out the fermentation under aerobic conditions at temperatures ranging from about 25 to about 37° C. for a period ranging from three to five days.

8. In a process for the production of cycloserine by the fermentation of the cycloserine-producing microorganism *Streptomyces orchidaceous*, the improvement which comprises carrying out the fermentation in an aqueous fermentation medium consisting essentially of from about 3 to about 8% of a carbohydrate, from about 0.3 to about 1.0% urea, as the sole source of available nitrogen, a magnesium source, a potassium source, an iron source, a zinc source, a manganese source and water, wherein a ratio of carbohydrate to available nitrogen is maintained at from about 10 to 1 to about 20 to 1 under submerged aerobic conditions at a temperature ranging from about 25 to about 37° C. for a period ranging from about three to five days and recovering free cycloserine.

9. In a process for the production of cycloserine by the fermentation of the cycloserine-producing microorganism *Streptomyces orchidaceous*, the improvement which comprises carrying out the fermentation in an aqueous fermentation medium consisting essentially of from about 3 to about 8% of a carbohydrate selected from the group consisting of starch and cerelose, from about 0.3 to about 1.0% urea as the sole source of available nitrogen, .05% $MgSO_4$, .05% $K_2HPO_4$, .002% $FeSO_4$, .002% $ZnSO_4$, .001% $MnSO_4$, 0.4% lard oil and the balance water wherein a ratio of carbohydrate to available nitrogen is maintained at from about 15 to 1 to about 20 to 1 under submerged aerobic conditions at a temperature ranging from about 25 to about 37° C. for a period ranging from about one to five days and recovering free cycloserine.

References Cited in the file of this patent

UNITED STATES PATENTS

| | | |
|---|---|---|
| 2,773,878 | Shull et al. | Dec. 11, 1956 |
| 2,906,673 | Borrow et al. | Sept. 29, 1959 |

FOREIGN PATENTS

| | | |
|---|---|---|
| 730,919 | Great Britain | June 1, 1955 |